United States Patent [19]

Kondo et al.

[11] Patent Number: 4,829,644
[45] Date of Patent: May 16, 1989

[54] METHOD OF MOLDING SKIN-COVERED FOAMED PLASTIC ARTICLE

[75] Inventors: Nobuaki Kondo, Chigasaki; Kiichiro Ishimaru, Ayase, both of Japan

[73] Assignees: Nissan Motor Co., Ltd., Yokohama; Ikeda Bussan Co., Ltd., Ayase, both of Japan

[21] Appl. No.: 186,961

[22] Filed: Apr. 27, 1988

[30] Foreign Application Priority Data

Jun. 1, 1987 [JP] Japan ............... 62-137992

[51] Int. Cl.$^4$ ............................................. B68G 7/00
[52] U.S. Cl. .................................... 29/91.1; 29/460; 264/46.6; 264/46.8; 264/257; 264/267
[58] Field of Search ............... 29/460, 91.1, 91.5; 264/46.6, 46.8, 257, 267; 297/445

[56] References Cited

U.S. PATENT DOCUMENTS

| | | | |
|---|---|---|---|
| 2,976,577 | 3/1961 | Gould | 264/46.6 |
| 3,161,436 | 12/1964 | Hood | 264/46.6 X |
| 3,314,721 | 4/1967 | Smith | 297/445 |
| 3,374,517 | 3/1968 | Worley | 29/91.1 |
| 3,505,436 | 4/1970 | Krug | 264/46.6 X |
| 3,576,059 | 4/1971 | Pearson | 29/91.1 |
| 3,983,614 | 10/1976 | Koepke et al. | 29/91.5 X |
| 4,119,583 | 10/1978 | Filip et al. | 264/46.6 X |
| 4,501,541 | 2/1985 | Bethell | 264/46.6 X |

FOREIGN PATENT DOCUMENTS 60-18434  5/1985  Japan .

Primary Examiner—Charlie T. Moon
Attorney, Agent, or Firm—Foley & Lardner, Schwartz, Jeffery, Schwaab, Mack, Blumenthal & Evans

[57] ABSTRACT

Herein disclosed is a method of producing a skin-covered foamed polyurethane article, such as a seatback proper of an automotive seat, a seat cushion proper of the same or the like. A bag-shaped skin member which is to constitute the skin of the article consists of two parts which have respective inwardly projected peripheral portions stitched up. One of the peripheral portions is folded back fully to constitute a thicker peripheral portion. A mold used for molding the article has a groove which extends around the side wall of the cavity. The skin member is put into the cavity of the mold in such a manner that the thicker portion is forcedly received in the groove, and then a liquid material of polyurethane is poured into the bag-shaped skin member.

9 Claims, 2 Drawing Sheets

METHOD OF MOLDING SKIN-COVERED FOAMED PLASTIC ARTICLE

BACKGROUND OF THE INVENTION

1. Field of the Invention

The present invention relates in general to a method of molding a foamed plastic article, and more particularly to a method of molding a skin-covered foamed plastic article, which generally comprises by steps placing a bag-shaped skin member in a mold in a manner to intimately cover the wall of the cavity of the mold, pouring a liquid material of foamed plastic into the bag-shaped skin member in the mold, curing the material and removing a product, viz., a skin-covered foamed plastic article from the mold upon hardening of the material.

2. Description of the Prior art

In order to clarify the task of the present invention, one conventional method of molding a skin-covered foamed plastic article will be described with reference to FIGS. 3, 4 and 5 of the accompanying drawings, which method is disclosed in Japanese Patent Second Provisional Publication No. 60-18434.

Referring to FIG. 3, there is shown a seat 100 of a motor vehicle, which includes a seat cushion (no numeral) and a seatback 101 which are produced by the conventional molding method. The seatback 101 includes a foamed plastic portion 104 serving as a cushion means, a skin member 103 intimately covering the foamed plastic portion 104 and a metal frame 105 serving as a structural base of the seatback 101. As is seen from FIG. 4, the skin member 103 is shaped like a bag consisting of stitched two parts, one being a front part 103A and the other being a side part 103B. These two parts 103A and 103B have respective inwardly projected peripheral portions stitched up. The stitched portions are denoted by reference "N", which, as is seen from FIG. 3, extend around the side walls of the seatback 101. As is best shown in FIG. 5, each part 103A or 103B of the skin member 103 is of a two-layered skin which comprises an outer skin "O" of cloth and an inner skin "I" of wadding.

The seatback 101 having the above-mentioned construction is produced by employing the following producing steps.

First, a bag-shaped skin member 103 is put into a cavity of the mold with its mouth portion directed upward. Then, a liquid material of foamed polyurethane is poured into the bag-shaped skin member 103 in the mold. Then, a lid is put on the mold to close the cavity of the mold. During curing, the material foams and thus presses the skin member 103 on the inner wall of the mold. After the material is cured and hardened to a certain level, a skin-covered foamed polyurethane article, viz., a skin-covered seatback pad, is removed from the mold. Then, the seatback pad is fixed to the metal frame 105 to constitute the seatback 101.

However, in the conventional method as described hereinabove, it is very difficult to provide the stitched portions "N" with a satisfied external appearance having suitable waves. That is, when the urethane material overfoams for some reason, the front and side parts 103A and 103B of the skin member 103 are overly drawn by each other thereby forming a simple and flat outer looking at the stitched portions "N". While, when the foaming of the urethane material is poor, unsightly creases are numerously formed on the stitched portions "N".

SUMMARY OF THE INVENTION

It is therefore an object of the present invention to provide a method of molding a skin-covered foamed plastic article which is free of the above-mentioned drawback.

According to the present invention, there is provided an improved method by which a skin-covered foamed polyurethane pad, for seatback or seat cushion, providing the stitched portions with a desired outer looking with waves is produced.

According to the present invention, there is provided a method of producing a skin-covered foamed plastic article, which comprises by steps, preparing a bag-shaped skin member which consists of two parts, the two parts having respective inwardly projected peripheral portitions stitched up, one of the peripheral portions being folded back fully to constitute a thicker peripheral portion; preparing a mold which has a cavity formed therein, the cavity having at its wall an elongate ridge thereby to define a groove at a given portion of the cavity; putting the skin member in the cavity in such a manner that the thicker peripheral portion is forcedly received in the groove; pouring a liquid material of foamed plastic into the bag-shaped skin member in the mold; inserting a shaping die into the cavity; putting a lid member on the mold thereby to enclose the cavity; and removing, upon sufficient hardening of the material, the lid member and the shaping die and taking out a hardened product of foamed plastic from the mold.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
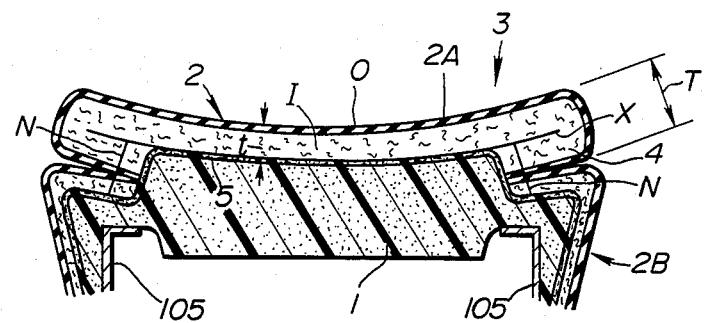
FIG. 1 is a sectional view of a seatback of an automotive seat, which is produced through a method of the present invention.
Figure 3:
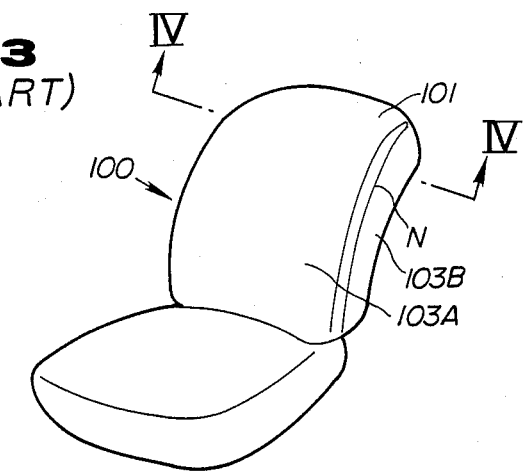
FIG. 3 is a perspective view of an automotive seat having a seat cushion and a seatback which are produced through a conventional molding method.
Figure 4:
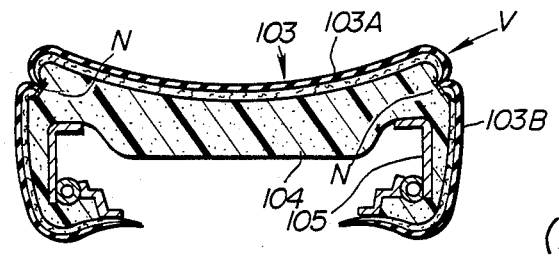
FIG. 4 is a sectional view of the seatback of FIG. 3.
Figure 5:
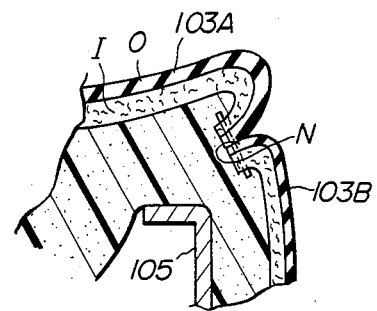
FIG. 5 is an enlarged sectional view of the part indicated by reference "V" in FIG. 4.

Referring to FIG. 1, there is shown a seatback 3 of an automotive seat, which is produced through a method of the present invention. Similar to the aforementioned conventional one, the seatback comprises a foamed polyurethane portion 1 serving as a cushion means, a skin member 2 intimately covering the foamed portion 1 and a metal frame 105 serving as a structural base of the seatback. Denoted by numeral 5 is a border part between the foamed polyurethane portion 1 and the skin member 2, where relatively rigid urethane resin is formed. The skin member 2 is shaped like a bag consisting of stitched two parts, one being a front part 2A and the other being a side part 2B. These two parts 2A and 2B have respective inwardly projected peripheral portions "N" stitched up. The stitched portion "N" extends along a peripheral ridge portion of the seatback, similar to the conventional seatback 101 of FIG. 3. Each part 2A or 2B of the skin member 2 is of a two-layered skin which comprises an outer skin "O" of cloth and an inner skin "I" of wadding.

It is to be noted that, as is seen from FIG. 1, the peripheral portion of the front part 2A of the skin member 2 is folded back fully to constitute a thicker peripheral portion 4. Thus, the thickness "T" of this thicker peripheral portion 4 is substantially two times as large as that "t" of the major portion of the front part 2A.

Figure 2:
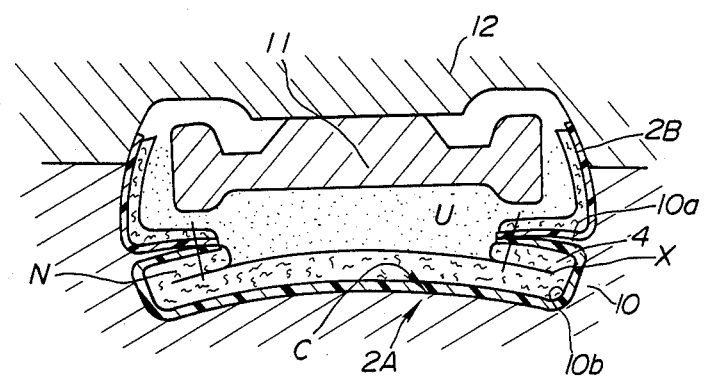
FIG. 2 is a sectional view of the seatback, showing a condition wherein the seatback is under molding process.

In the following, a method of molding the seatback will be described with reference to FIG. 2. For this molding, a dividable mold consisting of lower and upper mold parts 10 and 12, and a shaping die 11 are used. As is shown in the drawing, the lower mold part 10 has an elongate ridge 10a which extends around side walls of a cavity "C" of the lower mold part 10. Due to provision of the elongate ridge 10a, there is defined in the cavity "C" a groove 10b which extends around the side walls of the cavity.

First, an adhesive tape or the like is attached to a bottom wall of the cavity "C" of the lower mold part 10, and a skin member 2 having the above-mentioned shape is prepared with its mouth portion directed upward. Then, the skin member 2 is put into the cavity "C" of the lower mold part 10 in such a manner that the thicker peripheral portion 4 of the skin member 2 is forcedly received in the groove 10b of the cavity "C". With this, the thicker peripheral portion 4 of the front part 2A of the skin member 2 has the mutually conctacting portions "X" thereof much pressed against each other. This prevents the urethane material "U" from entering a space defined by the mutually contacting portions "X". Then, a liquid material of foamed polyurethane "U" is poured into the bag-shaped skin member 2 through the mouth portion thereof. Then, the shaping die 11 is inserted into the cavity "C" and the upper mold part 12 is put on the lower mold part 10 to enclose the cavity "C". Although not shown in the drawing, suitable clamping devices are used to clamp the mold parts 10 and 12. Thus, thereafter, the material "U" is forced to cure in the limited space defined by the lower and upper mold parts 10 and 12 and the shaping die 11. During this curing, the material foams and thus presses the skin member 2 on the inner wall of the cavity "C". It is now to be noted that, due to presence of the elongate ridge 10a in the cavity "C", the front part 2A and the side part 2B keep their original proper positions in the cavity "C" even when the material "U" overfoams. This position keeping is promoted by the adhesive tape attached to the bottom wall of the cavity "C".

After a given time for which the material is cured and hardened to a certain level, the upper mold part 12 and the shaping die 11 are removed from the lower mold part 10, and then a product, viz., the seatback, is removed from the lower mold part 10. Thereafter, the product is mounted to the frame 105.

In the following, advantages of the present invention will be described.

First, because of provision of the elongate ridge 10a in the lower mold part 10, the front and side parts 2A asnd 2B of the skin member 2 can keep their original proper positions in the mold even when the urethane material "U" overfoams during its curing. Thus, the product, viz., the skin-covered seatback pad, can provide the stitched portions "N" with a desired external appearance with waves.

Second, since the thicker portion 4 of the front part 2A of the skin member 2 is tightly put in the groove 10b of the lower mold part 10, the liquid urethane material "U" is prevented from entering the space defined by the mutually contacting portions "X" of the thicker portion 4. Thus, the original form of the thicker portion 4 of the skin member 2 is left unchanged.

Third, since the adhesive tape is attached to the bottom of the cavity of the lower mold part 10, the skin member 2 is kept stable during pouring of the urethane material into the mold.

Although the above description is directed to a seatback of an automotive seat, the invention is also applicable to a method of producing a seat cushion of the seat.

What is claimed is:

1. A method of producing a skin-covered foamed plastic article, comprising by steps:
    (a) preparing a bag-shaped skin member which consists of two parts, the two parts having respective inwardly projected peripheral portitions stitched up, one of said peripheral portions being folded back fully to constitute a thicker peripheral portion;
    (b) preparing a mold which has a cavity formed therein, said cavity having at its wall an elongate ridge thereby to define a groove at a given portion of said cavity;
    (c) putting said skin member in said cavity in such a manner that said thicker peripheral portion is forcedly received in said groove;
    (d) pouring a liquid material of foamed plastic into the bag-shaped skin member in the mold;
    (e) inserting a shaping die into said cavity;
    (f) putting a lid member on said mold thereby to close said cavity; and
    (g) removing, upon sufficient hardening of the material, said lid member and said shaping die and taking out a hardened product of foamed plastic from the mold.

2. A method as claimed in claim 1, in which an adhesive tape is attached to a bottom surface of the cavity of the mold before the step (c).

3. A method as claimed in claim 2, in which said bag-shaped skin member is placed in said cavity having its mouth portion directed upward.

4. A method as claimed in claim 3, in which during curing of the material of foamed plastic, said lid is kept clamped to said mold.

5. A method as claimed in claim 4, in which after the step (g), said product is mounted to a frame member.

6. A method as claimed in claim 1, in which said material is a liquid material of polyurethane foam.

7. A method as claimed in claim 1, in which the thickness of said thicker peripheral portion of the skin member is greater than the width of said groove of said mold.

8. A method as claimed in claim 7, in which said skin member is of a two-layered skin which comprises an outer skin of cloth and an inner skin of wadding.

9. A method as claimed in claim 8, in which the thickness of said thicker peripheral portion is substantially two times as large as that of a major portion of the skin member.

* * * * *